US009890747B2

(12) United States Patent
Williams et al.

(10) Patent No.: US 9,890,747 B2
(45) Date of Patent: Feb. 13, 2018

(54) TANK PRESSURE CONTROL SOLENOID WITH PASSIVE TANK VACUUM

(71) Applicant: Continental Automotive Systems, Inc., Auburn Hills, MI (US)

(72) Inventors: Ben Dominick Williams, Chatham (CA); David William Balsdon, Chatham (CA); Robert Douglas Jefford, Chatham (CA); David Rene Forgeron, Chatham (CA); Brian Gordon Woods, Chatham (CA)

(73) Assignee: Continental Automotive Systems, Inc., Auburn Hills, MI (US)

( * ) Notice: Subject to any disclaimer, the term of this patent is extended or adjusted under 35 U.S.C. 154(b) by 1 day.

(21) Appl. No.: 14/676,480

(22) Filed: Apr. 1, 2015

(65) Prior Publication Data

US 2015/0316007 A1 Nov. 5, 2015

Related U.S. Application Data

(60) Provisional application No. 61/988,619, filed on May 5, 2014.

(51) Int. Cl.
*F02M 25/08* (2006.01)
*F16K 17/04* (2006.01)
(Continued)

(52) U.S. Cl.
CPC ..... *F02M 25/089* (2013.01); *B60K 15/03519* (2013.01); *F02M 25/0836* (2013.01); *F02M 25/0854* (2013.01); *F02M 25/0872* (2013.01); *F16K 17/0413* (2013.01); *F16K 31/0655* (2013.01); *B60K 2015/03585* (2013.01);
(Continued)

(58) Field of Classification Search
CPC .......... F02M 25/089; F02M 2025/0845; Y10T 137/7761; Y10T 137/87338; Y10T 137/0396; Y10T 137/87555; Y10T 137/8733; Y10T 137/0379; Y10T 137/7897; Y10T 137/7931; B60K 15/03519; B60K 2015/03585; F16K 31/0655; F16K 17/0413
See application file for complete search history.

(56) References Cited

U.S. PATENT DOCUMENTS 2,072,271 A * 3/1937 Meadows ................ F16K 1/34
137/541
3,335,751 A * 8/1967 Davis, Jr. ............. F16K 15/026
137/541
(Continued)

FOREIGN PATENT DOCUMENTS

CN 102454510 A 5/2012
CN 103764987 A 4/2014
DE 102011054565 A1 6/2012

*Primary Examiner* — Atif Chaudry

(57) ABSTRACT

A valve assembly providing flow control between a fuel tank and a carbon canister, which includes two valves providing two different flow paths, where the first valve provides active vacuum relief along the first flow path, and the second valve provides passive vacuum relief along the second flow path. A reservoir is added to the cap which is common for both flow paths. The second valve has a sealing valve member and a biasable member that passively relieves fuel tank vacuum pressure at a predetermined vacuum level.

12 Claims, 2 Drawing Sheets

(51) Int. Cl.
    *F16K 31/06*       (2006.01)
    *B60K 15/035*    (2006.01)

(52) U.S. Cl.
    CPC ............... *F02M 2025/0845* (2013.01); *Y10T 137/0379* (2015.04); *Y10T 137/0396* (2015.04); *Y10T 137/7761* (2015.04); *Y10T 137/7897* (2015.04); *Y10T 137/7931* (2015.04); *Y10T 137/86292* (2015.04); *Y10T 137/8733* (2015.04); *Y10T 137/87338* (2015.04); *Y10T 137/87555* (2015.04)

(56) References Cited

U.S. PATENT DOCUMENTS

| | | | |
|---|---|---|---|
| 4,703,737 A | 11/1987 | Cook et al. | |
| 5,211,151 A | 5/1993 | Nakajima et al. | |
| 5,497,754 A * | 3/1996 | Ito | B60K 15/03519 123/520 |
| 6,058,913 A * | 5/2000 | Busato | F02M 25/0836 123/520 |
| 2012/0138610 A1 | 6/2012 | Lee | |
| 2013/0008537 A1* | 1/2013 | Onodera | F16K 17/18 137/614.2 |
| 2014/0041737 A1 | 2/2014 | Pifer et al. | |
| 2015/0000772 A1 | 1/2015 | Onodera | |

\* cited by examiner

TANK PRESSURE CONTROL SOLENOID WITH PASSIVE TANK VACUUM

CROSS-REFERENCE TO RELATED APPLICATIONS

This application claims the benefit of U.S. Provisional Application No. 61/988,619 filed May 5, 2014. The disclosure of the above application is incorporated herein by reference.

FIELD OF THE INVENTION

The invention relates generally to a valve assembly having at least two valves located in parallel to provide two flow paths for air and fuel vapor, where one of the valves provides passive relief of vacuum pressure in one direction.

BACKGROUND OF THE INVENTION

Carbon canisters are generally known, and are used for capturing and storing vapor from a fuel tank, which is transferred to the engine through a canister purge valve. Typically, these fuel tanks are open to atmosphere via the carbon canister, thereby keeping the tank pressure near atmospheric pressure at all times. In newer, sealed tank systems, the fuel tank is isolated from the canister, and is capable of storing vapor under pressure, or vacuum, to a set pressure/vacuum level. The amount of fuel in the fuel tank varies as the fuel is consumed during vehicle travel, and during refueling at a service station. During vehicle travel, the amount of fuel in the fuel tank is decreased, creating vacuum pressure in the fuel tank. In a sealed tank system, this vacuum pressure must be relieved to eliminate the possibility of collapsing the tank. Approaches to relieving this vacuum pressure have included a solenoid having a valve which controls the amount of air flow back into the tank under vacuum pressure conditions, and the flow of fuel vapor to the carbon canister.

Some of these canister purge valves use short pulses to open and close the valve rapidly to keep the vapors contained in the tank as much as possible, while also providing vacuum relief. While this approach provides controlled vacuum relief, it does not provide for passive (uncontrolled) vacuum relief, separately from the flow control.

Accordingly, there exists a need for a valve assembly which is able to provide active and passive relief of vacuum pressure in a fuel tank.

SUMMARY OF THE INVENTION

The present invention is a valve assembly which includes an additional valve and flow path to allow for vacuum relief to be performed separately from the flow control, which improves control of flow and the pressure level where vacuum is relieved.

The present invention uses a valve assembly for flow control, and adds a second flow path with a second valve having a sealing disk and spring assembly that relieves fuel tank vacuum pressure at a predetermined vacuum level. A reservoir is added to the cap which is common for both flow paths. The second flow path for vacuum relief provides good control of armature travel and thus flow. The valve design of the present invention uses a second flow path to provide precise vacuum relief.

In one embodiment, the present invention is a valve assembly, which includes an overmold assembly having an overmold assembly cavity, a cap having a cap aperture, the cap being connected to the overmold assembly, and a reservoir having a reservoir cavity, where the reservoir is connected to the cap. A first valve is mounted in the overmold assembly and selectively places the overmold assembly cavity in fluid communication with the reservoir cavity. A second valve is mounted to the cap and selectively places the overmold assembly cavity in fluid communication with the reservoir cavity. The first valve and the second valve provide parallel flow paths between the overmold assembly cavity and the reservoir cavity, such that the first valve provides active vacuum relief of the overmold assembly cavity, and the second valve provides passive vacuum relief of the overmold assembly cavity.

The first valve includes an armature and a valve seat. The valve seat is formed as part of the cap such that the valve seat substantially surrounds the cap aperture. The armature is selectively in contact with the valve seat to actively control the flow of air and purge vapor through the cap aperture between the overmold assembly cavity and the reservoir cavity.

The second valve includes a valve plate selectively in contact with a valve seat, and a guide member integrally formed with the valve plate. The guide member has a notch, and the guide member is slidably disposed within an aperture formed as part of the cap. A spring is in contact with the guide member and the cap, and a portion of the spring is located in the notch such that the spring applies force to the cap and the notch, biasing the valve plate to towards the valve seat. The valve plate is in contact with the valve seat when the vacuum pressure in the overmold assembly cavity is less than the force applied to the notch by the spring, and when the vacuum pressure in the overmold assembly cavity is greater than the force applied to the notch by the spring, the valve plate moves away from the valve seat, placing the second valve in the open position, reliving the vacuum pressure in the overmold assembly cavity.

At least one rib is formed as part of the guide member, and an aperture is formed as part of the cap. However, multiple ribs circumscribing the guide member function to guide the movement of the valve plate. The guide member moves through the aperture as the valve is moved towards and away from the valve seat. When the valve is moved away from the valve seat, air and purge vapor are able to flow through the aperture and around the ribs between the overmold assembly cavity and the reservoir cavity.

In one embodiment, the overmold assembly cavity is in fluid communication with a gas tank, and the first valve and the second valve provide vacuum relief to the gas tank. The second valve provides passive vacuum relief such that when the vacuum pressure in the overmold assembly cavity is less than the force applied to the notch by the spring, the second valve is in the closed position. When the vacuum pressure in the overmold assembly cavity is greater than the force applied to the notch by the spring, the valve plate moves away from the valve seat, placing the second valve in the open position, relieving the vacuum pressure in the overmold assembly cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
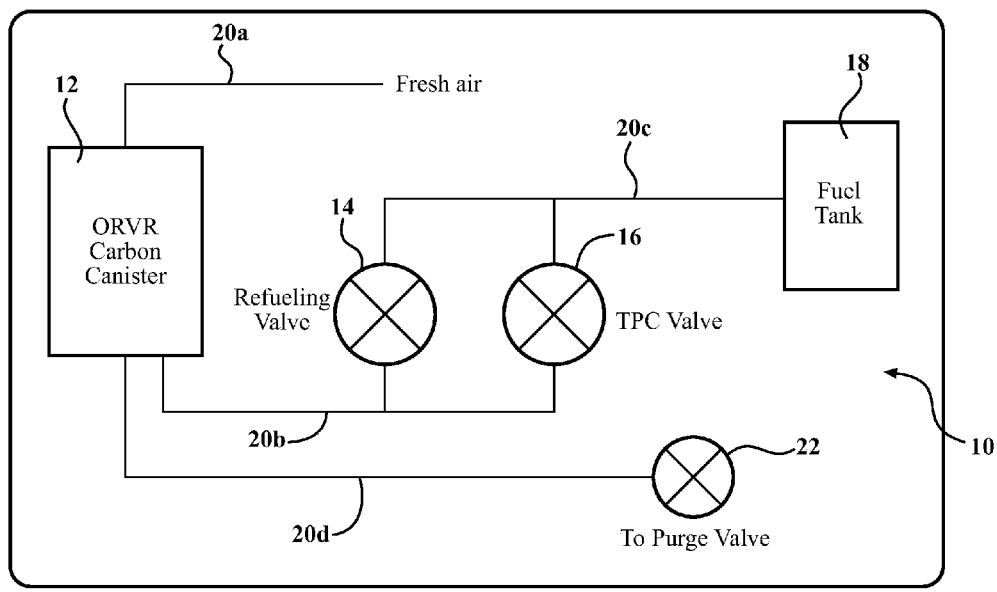
FIG. 1 is a diagram of an air flow system having a valve assembly, according to embodiments of the present invention.

The following description of the preferred embodiment(s) is merely exemplary in nature and is in no way intended to limit the invention, its application, or uses.

A diagram of a portion of an airflow system of a vehicle having a valve assembly according to the present invention is shown generally at 10. The system 10 includes a carbon canister 12 in fluid communication with the atmosphere through the use of a first conduit 20a. The system 10 also includes a second conduit 20b which is in fluid communication with the carbon canister 12, and also a refueling valve 14 and a TPC valve assembly 16. There is a third conduit 20c which is connected to and provides fluid communication between a fuel tank 18 and both the refueling valve 14 and the valve assembly 16. There is also a fourth conduit 20d, which is connected to the carbon canister 12 and provides fluid communication between the carbon canister 12 and the remaining components of the air flow system 10, represented at 22.

Figure 3:
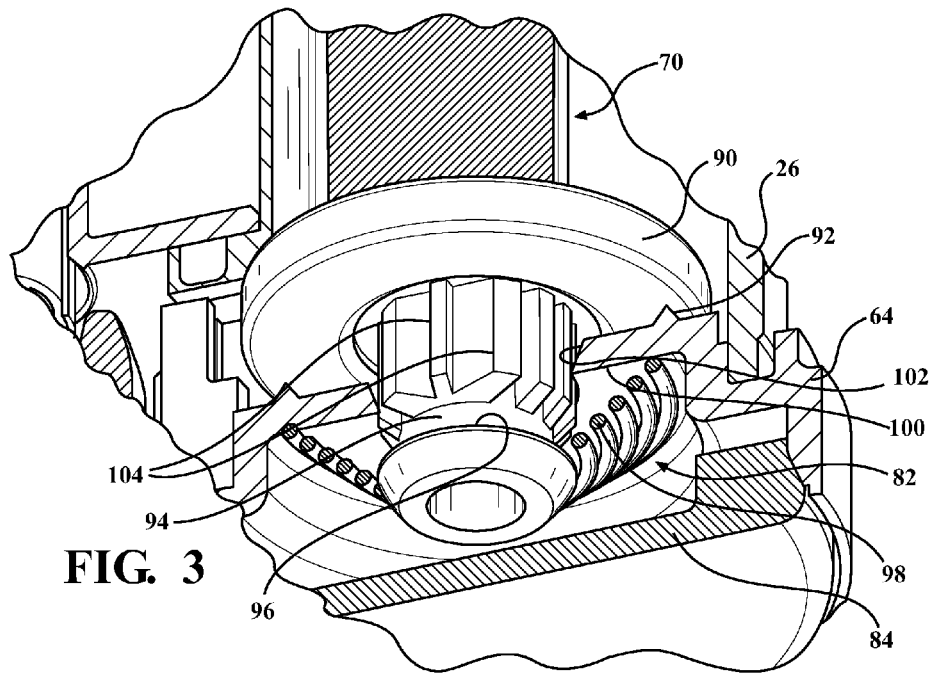
FIG. 3 is partial cutaway view of a valve assembly, according to embodiments of the present invention.
Figure 2:
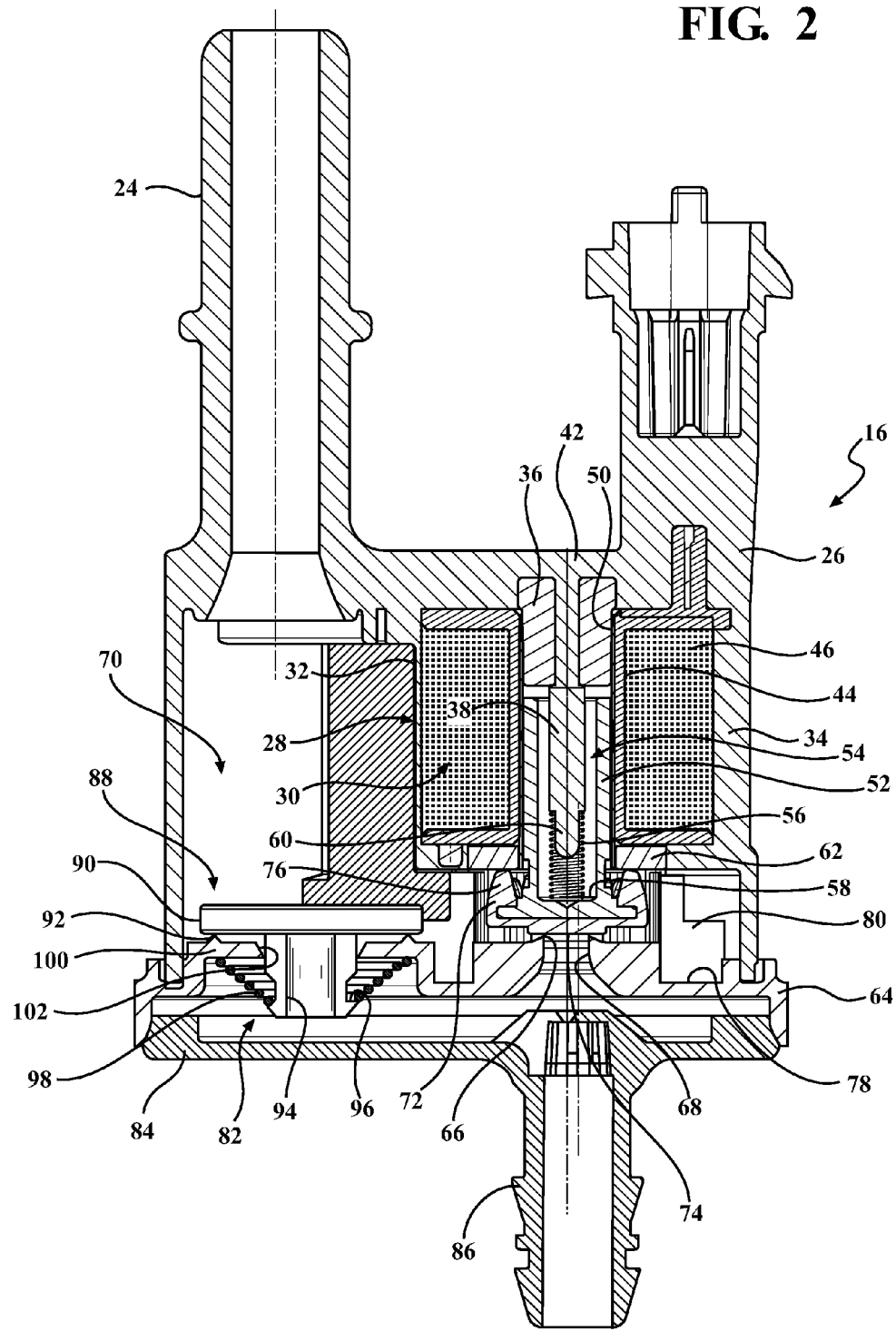
FIG. 2 is a sectional side view of a valve assembly, according to embodiments of the present invention.

Referring to FIGS. 2-3, the valve assembly 16 includes a first port 24 connected to the third conduit 20c. The valve assembly 16 also includes an overmold assembly 26, and disposed within the overmold assembly 26 is a first valve, shown generally at 28, which in this embodiment is a solenoid assembly. The solenoid assembly 28 is disposed within a cavity, shown generally at 30, formed as part of the overmold assembly 26, and the cavity 30 includes an inner wall portion 32, and also forming part of the cavity 30 is an outer wall portion 34 of the overmold assembly 26.

The solenoid assembly 28 includes a stator insert 36 which surrounds a support 38 formed as part of the overmold assembly 26. The overmold assembly 26 has an upper wall 42, and in contact with the upper wall 42 is a bobbin 44. The bobbin 44 is surrounded by a coil 46, and two straps (not shown) surround the coil 46. There is a sleeve 50 which is surrounded by the bobbin 44, and the sleeve 50 partially surrounds a moveable armature 52. The armature 52 includes a cavity, shown generally at 54, and located in the cavity 54 is a spring 56, which is in contact with an inner surface 58 of the cavity 54. The spring 56 is also mounted on a narrow diameter portion 60 of the support 38. Disposed between part of the armature 52 and the bobbin 44 is a second washer 62. Connected to the overmold assembly 26 is a cap 64, and formed as part of the cap 64 is a valve seat 66 and a cap aperture 68, where purge vapor is able to flow from an overmold assembly cavity, shown generally at 70, formed as part of the overmold assembly 26, and through the cap aperture 68. The first port 24 provides fluid communication between the overmold assembly cavity 70 and the third conduit 20c.

The armature 52 includes a stopper portion 72 which is made of a rubber or other flexible material. The stopper portion 72 includes a contact surface 74 which contacts the valve seat 66 when the armature 52 is in the closed position. The stopper portion 72 includes a plurality of post members 76, which are of the same durometer, but are of different sizes, and therefore have different levels of stiffness. The largest post members 76 are in contact with the bottom surface of the washer 62 when the armature 52 is in the closed position, as shown in FIG. 2. The smaller post members 76 contact the bottom surface of the washer 62 when the armature 52 moves to the open position. The more the coil 46 is energized, the further the armature 52 moves away from the valve seat 66, and the greater number of post members 76 contact the bottom surface of the washer 62. The movement of the armature 52 to open and close the solenoid assembly 28 controls the amount of air allowed to pass through the valve assembly 16, and into the fuel tank 18.

Because the post members 76 are made of rubber, the post members 76 are able to deform as the armature 52 is moved further away from the valve seat 66. The largest post members 76 in contact with the bottom surface of the washer 62 deform first when the armature 52 moves away from the valve seat 66. As the armature 52 moves further away from the valve seat 66, more of the post members 76 contact the bottom surface of the washer 62, and then begin to deform as the armature 52 moves even further away from the valve seat 66. The deformation of the post members 76 (when the armature 52 is moved to the open position away from the valve seat 66) functions to dampen the movement of the armature 52, eliminating noise, and preventing metal-to-metal contact between the armature 52 and the stator insert 36.

Disposed between the bottom surface of the washer 62 and an inside surface 78 of the cap 64 is a filter 80. The filter 80 is made of several blades of plastic which are adjacent one another. The filter 80 is designed to limit the size of debris and particles passing through the blades of plastic to less than 0.7 millimeters. The distance between the armature 52 and the stator insert 36 is about 1.0 millimeter when the armature 52 is in the closed position, and is the maximum allowable distance between the contact surface 74 of the stopper portion 72 and the valve seat 66. The filter 80 ensures that no particles may pass through the filter 80 that are too large to affect the functionality of the solenoid assembly 28 (the particles being too large to fit between the valve seat 66 and the stopper portion 72) when the armature 52 is in the open position.

The aperture 68 is also in fluid communication with a reservoir cavity, shown generally at 82, formed as part of a reservoir 84. The reservoir 84 is connected to the cap 64, and a second port 86 is formed as part of the reservoir 84. The second port 86 places the reservoir cavity 82 in fluid communication with the second conduit 20b. Connected to the cap 64 is a second valve, shown generally at 88, which is located in the overmold assembly cavity 70. The second valve 88 includes a valve member 90, which in this embodiment is a valve plate 90, selectively in contact with a valve seat 92. The valve plate 90 is integrally formed with a guide member 94, and the guide member 94 includes a notch 96, and the first end of a spring 98 is located in the notch 96, and the second end of the spring 98 is in contact with a flange portion 100 formed as part of the cap 64, such that the spring 98 biases the valve plate 90 towards the valve seat 92.

The valve seat 92 is formed as part of the flange portion 100, and also formed as part of the flange portion 100 is an aperture 102, where the guide member 94 moves through the aperture 102 as the plate 90 moves towards and away from the valve seat 92. The guide member 94 includes a plurality of ribs 104, which allow for the passing of air and purge vapor when the valve plate 90 is not in contact with the valve seat 92.

Both the first valve 28 and the second valve 88 are in fluid communication with the overmold assembly cavity 70 and the reservoir cavity 82. The first valve 28 is used to provide controlled flow of air and purge vapor through the valve assembly 16, and therefore provide active vacuum relief, and the second valve 88 is used to provide passive vacuum relief.

In operation, the refueling valve 14 is opened when the fuel tank 18 is being refueled, and closed during other times of the operation of the vehicle. During operation of the vehicle, as fuel is consumed by the engine, the fuel level in the fuel tank 18 decreases, creating vacuum pressure in the fuel tank 18, which also results in vacuum pressure in the third conduit 20c and the overmold assembly cavity 70. During one mode of operation, the solenoid assembly 28 moves the armature 52 and stopper portion 72 away from the valve seat 66, such that air passes from the second port 86, through the reservoir cavity 82, the cap aperture 68, into the overmold assembly cavity 70, the first port 24, the third conduit 20c, and into the fuel tank 18.

As mentioned above, the second valve 88 is able to provide passive vacuum relief. When there is vacuum pressure in the fuel tank 18, the third conduit 20c and the overmold assembly cavity 70 are also under vacuum pressure as well. If the vacuum pressure reaches a predetermined level, the vacuum pressure applied to the valve plate 90 overcomes the force of the spring 98 applied to the valve plate 90, and moves the valve plate 90 away from the valve seat 92, placing the second valve 88 in an open position. When the second valve 88 is in the open position, air is allowed to pass from the reservoir cavity 82, through the second valve 88, the overmold assembly cavity 70, through the first port 24, the third conduit 20c, and into the fuel tank 18. The air passes through the second valve 88 by flowing between the ribs 104 and through the aperture 102 when the valve plate 90 is not in contact with the valve seat 92. The air reaches the reservoir cavity 82 by flowing into the first conduit 20a from the atmosphere, through the carbon canister 12, the fourth conduit 20d, and through the second port 86.

Another function of the valve assembly 16 is the relief of vacuum pressure in the canister 12 and the fuel tank 18 of the vehicle after the vehicle is shut off. Due to fuel consumption over time, the fuel flows out of the fuel tank to the engine, creating vacuum pressure in the fuel tank 18 and the canister 12. The valve assembly 16 is capable of relieving this vacuum pressure. To relieve the vacuum pressure, the solenoid assembly 28 is pulsated after the vehicle is shut off. In one embodiment, the solenoid assembly 28 is pulsated at 10 Hz, but it is within the scope of the invention that the solenoid assembly 28 may be pulsated at other frequencies. This pulsation allows for air to flow from the second port 86 through the reservoir cavity 82, the cap aperture 68, into the overmold assembly cavity 70, the first port 24, the third conduit 20c, and into the fuel tank 18.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
    a valve assembly, including:
        a first valve in fluid communication with a carbon canister and a fuel tank;
        a second valve in fluid communication with the carbon canister and the fuel tank;
        a guide member, the guide member being part of the second valve;
        a plurality of guide ribs integrally formed with and radially extending from the guide member;
        a valve member being part of the second valve, the guide member and the valve member formed as a unitary single-piece component;
        an overmold assembly cavity, the fuel tank in fluid communication with the overmold assembly cavity, a portion of the second valve being located in the overmold assembly cavity; and
        a reservoir cavity, the carbon canister in fluid communication with the reservoir cavity, and a portion of the second valve being located in the reservoir cavity;
        a flange portion, the overmold assembly cavity located on one side of the flange portion, and the reservoir cavity located on another side of the flange portion;
        an aperture formed as part of the flange portion, the guide member extending through the aperture formed as part of the flange portion;
    wherein the first valve and the second valve provide fluid communication between the overmold assembly cavity and the reservoir cavity, and the first valve provides active control of air flow and purge vapor between the carbon canister and the fuel tank and active relief of vacuum pressure in the fuel tank, and the second valve provides passive relief of vacuum pressure in the fuel tank; wherein the first valve further includes: an armature, and a valve seat; wherein the armature is selectively in contact with the valve seat to actively control the flow of air and purge vapor between the carbon canister and the fuel tank; wherein the apparatus further includes an overmold assembly cavity, the overmold assembly cavity is formed as part of the overmold assembly; wherein the apparatus further includes a cap connected to the overmold assembly; wherein the apparatus further includes a reservoir connected to the cap, the reservoir cavity formed as part of the reservoir; wherein the first valve is located in and connected to the overmold assembly, and the second valve is connected to the cap; wherein the overmold assembly has a first port opening into the overmold assembly cavity, the first port located on a side of the overmold assembly opposite to the connection of the overmold assembly to the cap, wherein the first port has an axis parallel to an axis of the armature.

2. The apparatus of claim 1, the second valve further comprising:
    a valve seat, the valve member selectively in contact with the valve seat; and
    a biasable member connected to the valve member, the biasable member biasing the valve member to a closed position;
    wherein the force applied to the valve member from the biasable member is overcome by the vacuum pressure when the vacuum pressure in the fuel tank reaches a predetermined amount, such that the valve member moves away from the valve seat, placing the second valve in the open position.

3. The apparatus of claim 2, the second valve further comprising:
a notch formed as part of the guide member, a portion of the biasable member located in the notch such that the biasable member applies force to the notch, biasing the valve member towards the valve seat;
wherein the valve member is in contact with the valve seat when the vacuum pressure in the overmold assembly cavity is less than the force applied to the notch by the biasable member, and when the vacuum pressure in the overmold assembly cavity is greater than the force applied to the notch by the biasable member, the valve member moves away from the valve seat, placing the second valve in the open position, reliving the vacuum pressure in the overmold assembly cavity.

4. The apparatus of claim 1, the cap further comprising:
a cap aperture;
wherein the first valve provides fluid communication between the reservoir cavity and the overmold assembly cavity through the cap aperture when the first valve is in the open position.

5. The apparatus of claim 1, wherein the first valve and the second valve provide parallel flow paths between the reservoir cavity and the overmold assembly cavity.

6. A valve assembly, comprising:
an overmold assembly cavity in fluid communication with a fuel tank;
a reservoir cavity;
a first valve selectively providing fluid communication between the overmold assembly cavity and the reservoir cavity;
a second valve, a portion of the second valve being located in the overmold assembly cavity, and a portion of the second valve being located in the reservoir cavity, the second valve selectively providing fluid communication between the overmold assembly cavity and the reservoir cavity;
a guide member, the guide member being part of the second valve;
a plurality of guide ribs integrally formed with and radially extending from the guide member;
a valve member being part of the second valve, the guide member and the valve member formed as a unitary single-piece component;
a flange portion, the overmold assembly cavity located on one side of the flange portion, and the reservoir cavity located on another side of the flange portion; and
an aperture formed as part of the flange portion, the guide member extending through the aperture formed as part of the flange portion;
wherein the first valve and the second valve provide fluid communication between the overmold assembly cavity and the reservoir cavity, such that the first valve provides active vacuum relief of the overmold assembly cavity and the fuel tank, and the second valve provides passive vacuum relief of the overmold assembly cavity and the fuel tank; wherein the apparatus further includes an overmold assembly cavity, the overmold assembly cavity is formed as part of the overmold assembly; wherein the apparatus further includes a cap connected to the overmold assembly; wherein the apparatus further includes a reservoir connected to the cap, the reservoir cavity formed as part of the reservoir; wherein the first valve is mounted in the overmold assembly, and the second valve is mounted to the cap;
wherein the first valve further includes: an armature, a cap aperture formed as part of the cap, and a valve seat, the valve seat formed as part of the cap such that the valve seat substantially surrounds the cap aperture; wherein the armature is selectively in contact with the valve seat to actively control the flow of air and purge vapor through the cap aperture between the overmold assembly cavity and the reservoir cavity; wherein the overmold assembly has a first port opening into the overmold assembly cavity, the first port located on a side of the overmold assembly opposite to the connection of the overmold assembly to the cap, wherein the first port has an axis parallel to an axis of the armature.

7. The valve assembly of claim 6, the second valve further comprising:
a valve seat;
a biasable member in contact with the valve member, biasing the valve member toward the valve seat;
wherein the valve member is in contact with the valve seat when the vacuum pressure in the overmold assembly cavity is less than the force applied to the valve member by the biasable member, and when the vacuum pressure in the overmold assembly cavity is greater than the force applied to the valve member by the biasable member, the valve plate moves away from the valve seat, placing the second valve in the open position, reliving the vacuum pressure in the overmold assembly cavity.

8. The valve assembly of claim 7, the second valve further comprising:
a notch integrally formed with the guide member, at least a portion of the spring disposed in the notch; and
wherein the guide member moves as the valve is moved towards and away from the valve seat, and when the valve is moved away from the valve seat, air and purge vapor is able to flow around the plurality of guide ribs.

9. A valve with passive vacuum relief, comprising:
an overmold assembly;
an overmold assembly cavity formed as part of the overmold assembly;
a cap connected to the overmold assembly;
a cap aperture formed as part of the cap;
a reservoir connected to the cap;
a reservoir cavity formed as part of the reservoir;
a first valve mounted in the overmold assembly, the first valve selectively placing the overmold assembly cavity in fluid communication with the reservoir cavity; and
a second valve mounted to the cap, a portion of the second valve being located in the overmold assembly cavity, and a portion of the second valve being located in the reservoir cavity, the second valve selectively placing the overmold assembly cavity in fluid communication with the reservoir cavity;
a guide member, the guide member being part of the second valve;
a plurality of guide ribs integrally formed with and radially extending from the guide member;
a valve plate being part of the second valve, the guide member and the valve plate formed as a unitary single-piece component;
a flange portion, the overmold assembly cavity located on one side of the flange portion, and the reservoir cavity located on another side of the flange portion;
an aperture formed as part of the flange portion, the guide member extending through the aperture formed as part of the flange portion;

wherein the first valve and the second valve provide parallel flow paths between the overmold assembly cavity and the reservoir cavity, such that the first valve provides active vacuum relief of the overmold assembly cavity, and the second valve provides passive vacuum relief of the overmold assembly cavity; wherein first valve further includes an armature; and a valve seat, the valve seat formed as part of the cap such that the valve seat substantially surrounds the cap aperture; wherein the armature is selectively in contact with the valve seat to actively control the flow of air and purge vapor through the cap aperture between the overmold assembly cavity and the reservoir cavity; wherein the overmold assembly has a first port opening into the overmold assembly cavity, the first port located on a side of the overmold assembly opposite to the connection of the overmold assembly to the cap, wherein the first port has an axis parallel to an axis of the armature.

10. The valve with passive vacuum relief of claim 9, the second valve further comprising:
- the guide member slidably disposed within the aperture formed as part of the flange portion;
- a valve seat, the valve plate selectively in contact with the valve seat;
- a spring in contact with the guide member and the cap; and
- a notch formed as part of the guide member, a portion of the spring located in the notch such that the spring applies force to the cap and the notch, biasing the valve plate to towards the valve seat;
- wherein the valve plate is in contact with the valve seat when the vacuum pressure in the overmold assembly cavity is less than the force applied to the notch by the spring, and when the vacuum pressure in the overmold assembly cavity is greater than the force applied to the notch by the spring, the valve plate moves away from the valve seat, placing the second valve in the open position, relieving the vacuum pressure in the overmold assembly cavity.

11. The valve with passive vacuum relief of claim 10, wherein the guide member moves through the aperture as the valve is moved towards and away from the valve seat, and when the valve is moved away from the valve seat, air and purge vapor is able to flow through the aperture and around the plurality of guide ribs.

12. The valve with passive vacuum relief of claim 9, wherein the overmold assembly cavity is in fluid communication with a gas tank, and the first valve provides active vacuum relief to the gas tank, and the second valve provides passive vacuum relief to the gas tank.

* * * * *